United States Patent
Cagno et al.

(10) Patent No.: US 8,756,454 B2
(45) Date of Patent: *Jun. 17, 2014

(54) METHOD, APPARATUS, AND SYSTEM FOR A REDUNDANT AND FAULT TOLERANT SOLID STATE DISK

(71) Applicant: International Business Machines, Armonk, NY (US)

(72) Inventors: Brian J. Cagno, Tucson, AZ (US); John C. Elliott, Tucson, AZ (US); Gregg S Lucas, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,633

(22) Filed: May 13, 2013

(65) Prior Publication Data
US 2013/0246841 A1   Sep. 19, 2013

Related U.S. Application Data

(63) Continuation of application No. 13/460,496, filed on Apr. 30, 2012, now Pat. No. 8,489,914, which is a continuation of application No. 12/617,023, filed on Nov. 12, 2009, now Pat. No. 8,201,020.

(51) Int. Cl.
*G06F 11/07* (2006.01)
(52) U.S. Cl.
USPC .............................. 714/6.11; 714/11; 714/42

(58) Field of Classification Search
USPC .............................. 714/4.11, 6.2, 6.21, 11, 42
See application file for complete search history.

(56) References Cited

U.S. PATENT DOCUMENTS

| | | | |
|---|---|---|---|
| 5,699,510 A * | 12/1997 | Petersen et al. | 714/54 |
| 5,928,367 A | 7/1999 | Nelson | |
| 6,397,313 B1 | 5/2002 | Kasa et al. | |
| 6,567,889 B1 | 5/2003 | DeKoning et al. | |
| 7,187,613 B2 | 3/2007 | Yang | |
| 2003/0088735 A1 | 5/2003 | Busser et al. | |
| 2003/0200388 A1 * | 10/2003 | Hetrick | 711/114 |
| 2004/0210709 A1 | 10/2004 | Conley et al. | |
| 2005/0005062 A1 | 1/2005 | Liu et al. | |

(Continued)

FOREIGN PATENT DOCUMENTS

| | | |
|---|---|---|
| EP | 0772127 A1 | 5/1997 |
| WO | 02/19111 A2 | 3/2002 |
| WO | 2007/146845 A2 | 12/2007 |

OTHER PUBLICATIONS

MTI Announces New Solid-State Disk Database Accelerators: High-Speed Storage Systems Reduce Database I/O Bottlenecks, Business Wire, Aug. 22, 1996, http://findarticles.com/p/articles/mi_mOEIN/is_1996_August_22/ai_18607052/print?tag=artBody;col. 1.

*Primary Examiner* — Chae Ko
(74) *Attorney, Agent, or Firm* — Kunzler Law Group

(57) ABSTRACT

A solid state drive includes a first solid state disc controller (SSDC), a second SSDC and a flash array. The flash array includes a first flash port and a second flash port. The first SSDC is configured to connect to the flash array through the first flash port and the second flash array is configured to connect to the flash array through the second flash port.

18 Claims, 6 Drawing Sheets

(56) References Cited

U.S. PATENT DOCUMENTS

| | | |
|---|---|---|
| 2005/0015545 A1 | 1/2005 | Liu et al. |
| 2005/0073899 A1 | 4/2005 | Gallivan et al. |
| 2005/0135056 A1 | 6/2005 | Suzuki et al. |
| 2005/0271126 A1* | 12/2005 | Chiang et al. ............. 375/219 |
| 2006/0282610 A1 | 12/2006 | Daniel et al. |
| 2008/0072031 A1 | 3/2008 | Choi |
| 2008/0141055 A1 | 6/2008 | Danilak |
| 2008/0183974 A1 | 7/2008 | Lambert et al. |
| 2008/0189474 A1* | 8/2008 | Kim et al. ............. 711/103 |
| 2008/0307154 A1 | 12/2008 | Naderi et al. |
| 2010/0049914 A1* | 2/2010 | Goodwin ............. 711/114 |
| 2010/0082857 A1 | 4/2010 | Klein |
| 2010/0083040 A1 | 4/2010 | Voigt et al. |
| 2011/0153959 A1 | 6/2011 | Chu et al. |

* cited by examiner

METHOD, APPARATUS, AND SYSTEM FOR A REDUNDANT AND FAULT TOLERANT SOLID STATE DISK

CROSS-REFERENCE TO RELATED APPLICATIONS

This is a continuation application of and claims priority to U.S. patent application Ser. No. 13/460,496 entitled "METHOD APPARATUS AND SYSTEM FOR A REDUNDANT AND FAULT TOLERANT SOLID STATE DISK" and filed on Apr. 30, 2012 for Brian J. Cagno et al., which is incorporated herein by reference, and which is a continuation of and claims priority to U.S. Pat. No. 8,201,020 entitled "METHOD APPARATUS AND SYSTEM FOR A REDUNDANT AND FAULT TOLERANT SOLID STATE DISK" and filed on Nov. 12, 2009 for Brian J. Cagno et al., which is incorporated herein by reference.

BACKGROUND

1. Field

This invention relates to fast high density solid state memory devices, and implementing a redundancy scheme that works within a Solid State memory device.

2. Description

A hard disk drive (HDD) is a non-volatile storage device which stores data on rotating platters with magnetic surfaces. HDDs have been around for many years and storage manufacturers have continued to improve the rotational speed of the platters, and the tracks per inch which affects the access times for reading and writing data to and from the platters. In addition to increases in rotational speed, manufactures have continued to shrink the HDD footprint and increase the storage capacity. However, with all the advances made by disk manufacturers, the HDD is still a mechanical device with the inherent issues associated with mechanical equipment, and I/O performance is still limited by how far the head must seek to align with the desired track and the rotational speed of the device.

With the advent and pervasive use of NAND Flash memory in consumer devices flash memory costs have dropped dramatically, and their entry into solid state drives (SDDs) has begun. Current NAND Flash drives can do at least an order of magnitude more read operations per/sec than HDDs. Write and erase latency are on the same magnitude as read operations, but one can have dozens of Flash devices operating in parallel. The parallel Flash devices combined with buffers to accept the write data and pre-erase blocks to be able to accept the writes such that the writes per second ops per second can be 2 orders of magnitude greater, and these performance numbers are expected to increase.

As the amount of data generated and stored continues to increase, the need to secure the data has become a huge factor when considering options for storage. One method of securing data is to implement redundancy. Due to the relatively low cost of HDDs redundancy may be implemented by adding additional HDDs and striping the data across multiple drives. Such striping can be combined with a RAID code to increase the redundancy and lower probability of an outage due to a mechanical failure. Since the HDDs are relatively cheap, doing such striping is acceptable. However, the ops per second performance are still limited by the individual arms. Having to use so many disks to get acceptable performance and have redundancy built into all the various components in the subsystem results in higher power, cost and space.

SUMMARY

The present invention has been developed to provide a redundant and fault tolerant solid state disk responsive to the problems in the art discussed above.

Under one embodiment of the invention, a first Solid State Drive Controller (SSDC) is configured to connect to a first port of the dual port connector and to a first port of the flash array. A second SSDC is configured to connect to a second port of the dual port connector and to a second port of the flash array.

Under one embodiment of a method of the present invention, the arrangement of a master SSDC and a slave SSDC is determined by reading signals configured in a hardware configuration block and consulting a software configuration repository. The method may detect a failure of the master SSDC by the slave SSDC and a failure of the slave SSDC by the master SSDC.

The method transfers the captured copy of the I/O request received by the first SSDC from the dual port connector to the second SSDC, and transfers the I/O request captured by the second SSDC from the dual port connector to the first SSDC. Additionally, the method transfers the data associated with the write I/O request from the first SSDC to the second SSDC and transfers the data associated with the write I/O request from the second SSDC to the first SSDC.

The method may reassign the work from the master SSDC to the slave SSDC and reconfigures the slave SSDC to the master SSDC. The method implements memory access modes to prevent address contention to the flash array.

The invention may include a first solid state disk controller (SSDC) on a first printed circuit board connected to a port of a dual port connector and connected to a first port of a flash array. The method may also include a connector connecting the first SSDC to the first port of the dual port connector and may include a power source providing power to the first SSDC, a processor, and memory in connection with the processor.

Once a failure is detected in the first SSDC, the invention may automatically takes action such as retrying, rebooting, sending error messages, or halting.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
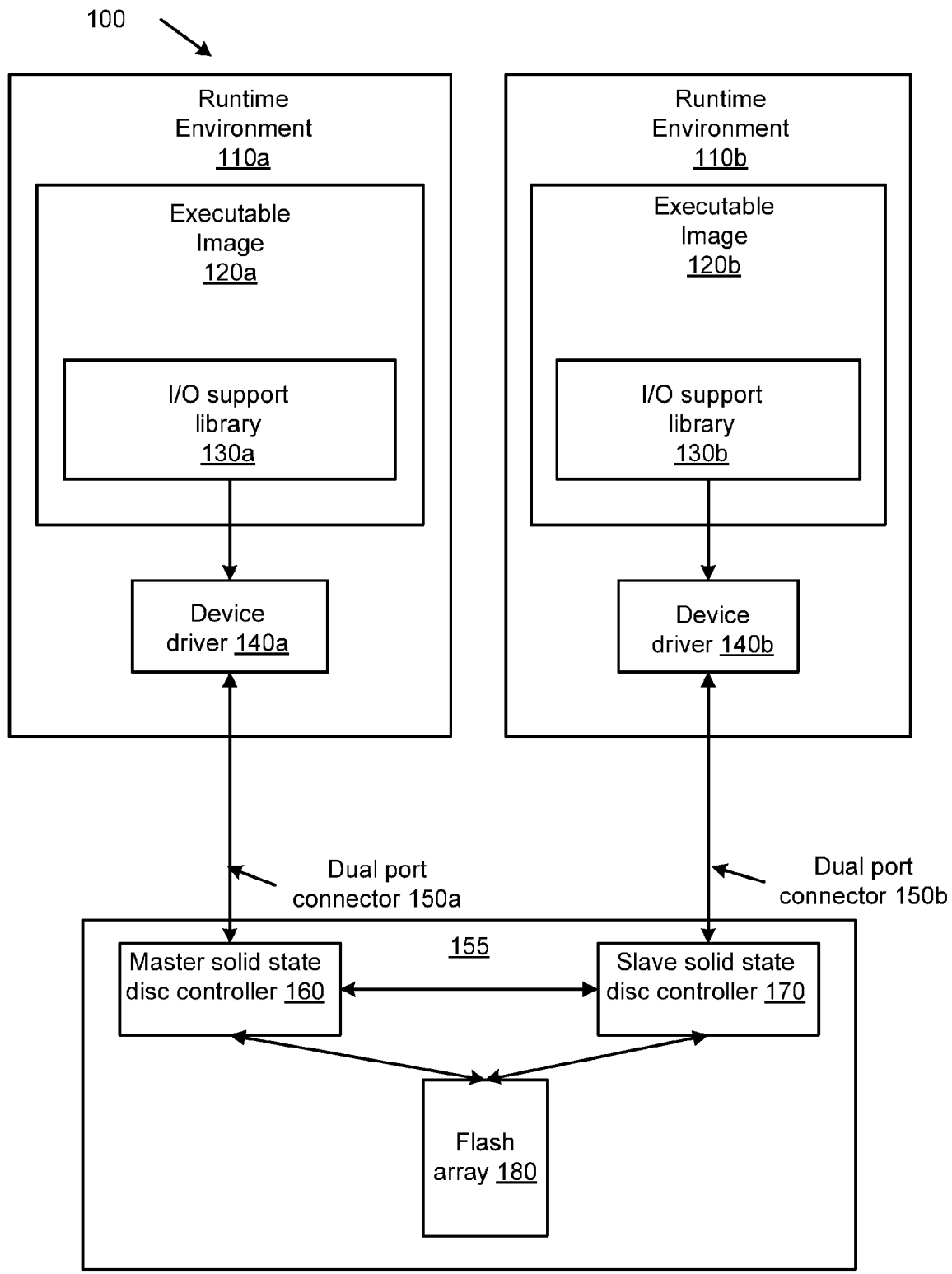
FIG. 1 is a schematic diagram illustrating a redundant and fault tolerant solid state disk, in accordance with one embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 that may make use of a fully redundant and fault tolerant solid state disk. The method 100 includes a runtime environment 110, an executable image 120, an I/O support library 130, a device driver 140, a dual port connector 150a-b, a redundant solid state disk controller 155, a master solid state disc controller (SSDC) 160, a slave SSDC 170, and a flash array 180.

The master SSDC 160, slave SSDC 170 and flash array 180 depict a redundant and fault tolerant solid state disc (SSD) 155. A user may implement redundancy by configuring the master SSDC 160 and slave SSDC 170 in parallel as illustrated in 155. The master SSDC 160 is configured identically to the slave SSDC 170 and capable of executing all the commands of the slave SSDC 170. Likewise the slave SSDC 170 is capable of executing all the commands of the master SSDC 160. In one embodiment, the master SSDC 160 and slave SSDC 170 configured with a flash array 180 as depicted in FIG. 1 implements a redundant SSD by eliminating any single point of failure.

The runtime environment 110 interacts with a computing system to execute code. In particular, the runtime environment 110 provides system resources to run the executable image 120. The runtime environment 110 may consist of one or more stand-alone or networked laptops, workstations or mainframe computer each comprising a processor and memory hardware. The runtime environment 110 may execute one or more executable images 120. The runtime environment 110 may include an Operating System (OS), and support basic editors, debuggers, user interface tools, and other testing tools. The OS may be Windows, Macintosh, UNIX, Linux or the like. The runtime environment 110 may connect to the World Wide Web (WWW). In one embodiment, the runtime environment 110 may include a storage repository for storing data read and written by an executable image 120.

The executable image 120 interacts with the resources of the runtime environment 110 to execute code. Specifically, the executable image 120 may comprise a workstation application, a servlet, a desktop application, a server application, a client application, a web-based application, and the like. The executable image 120 may be written in a programming language such as Java, C++, C, and may include a framework such as JVM, .Net or the like. The executable image 120 may be a stand-alone application, or an application that interfaces with other applications executing on a network. The executable image 120 may interact with users via a graphical user interface (GUI), command line, menu or file. In one embodiment, the executable image 120 may execute code to read data from or write data to a storage repository. Additionally, the OS in the runtime environment 110 may swap some or all of the executable image 120 to a storage repository as the OS manages the resources of the runtime environment 110.

The I/O support library 130 interacts with the executable image 120 to interface the executable image 120 with the runtime environment 110. In particular after the executable image 120 is compiled, a system linker links system calls in the executable image 120 to system services in the OS. The I/O support library 130 provides an interface between the executable image 120 and the system resources in the runtime environment 110. In one embodiment, reading and writing to a storage repository by the executable image 120 requires system services in the OS. The I/O support library 130 links the reads and writes of the executable image 120 to the OS of the runtime environment 110.

The device driver 140 interfaces hardware with the runtime environment 110. In particular, the device driver 140 converts the software reads and writes by the executable image 120 into reads and writes to the actual hardware. In one embodiment, the device driver 140 provides an interface between the executable image 120 and a dual port connector 150a-b to read from and write to a storage repository.

The dual port connector 150a-b interacts with the runtime environment 110 to read from and write to a storage repository. Specifically, the dual port connector 150a-b allows the runtime environment 110 to communicate with a master SSDC 160 and a slave SSDC 170. In one embodiment, the dual port connector 150a-b interfaces with the master SSDC 160 and slave SSDC 170 to allow the runtime environment 110 to provide electrical signals to read from and write to the flash array 180.

The master SSDC 160 interacts with the dual port connector 150a-b to receive data and commands. Specifically, the master SSDC 160 receives an I/O request from the dual port connector 150a, for reading and writing to the flash array 180. The I/O request may originate in the executable image 120, or in the OS in managing the hardware and software resources of the runtime environment 110.

In one embodiment, the method for implementing a redundant and fault tolerant solid state disk comprises two SSDCs outside of the NAND flash memory. The I/O request is captured by a master SSDC 160, a copy of the I/O request is created and transferred from the master SSDC 160 to a slave SSDC 170. The slave SSDC 170 may complete the I/O request if the master SSDC 160 fails. Additionally, an I/O request is captured by the slave SSDC 170, and a copy of the I/O request is created and transferred from the slave SSDC 170 to the master SSDC 160. The master SSDC 160 may complete the I/O request if the slave SSDC 170 fails.

The master SSDC 160 interacts with a slave SSDC 170 to implement redundancy. In particular, the master SSDC 160 receives the I/O request from a port of the dual port connector 150a-b. In one embodiment, the master SSDC 160 captures the I/O request. The master SSDC 160 creates a copy of the I/O request including the parameters associated with the I/O request to transfer to the slave SSDC 170.

The slave SSDC 170 interacts with the master SSDC 160 to receive data and commands. Specifically, the slave SSDC 170 receives I/O requests captured by the master SSDC 160 for reading and writing to the flash array 180. The I/O requests may originate in the executable image 120, or in the OS in managing the hardware and software resources of the runtime environment 110a.

Additionally, the slave SSDC 170 interacts with the dual port connector 150b to receive data and commands. Specifically, the slave SSDC 170 receives an I/O request from the dual port connector 150b, for reading and writing to the flash array 180. The I/O request originates in the executable image 120, or in the OS in managing the hardware and software resources of the runtime environment 110.

The slave SSDC 170 interacts with the master SSDC 180 to implement redundancy. In particular, the slave SSDC 170 receives the I/O request from a port of the dual port connector 150b. In one embodiment, the slave SSDC 170 captures the I/O request, creates a copy of the I/O request including the parameters associated with the I/O request to transfer to the master SSDC 160.

The master SSDC 160 interacts with the slave SSDC 170 to receive data and commands. Specifically, the master SSDC 160 receives I/O requests captured by the slave SSDC 170 for reading and writing to the flash array 180.

In one embodiment, the master SSDC 160 is connected to a first port of the dual port connector 150a, and the slave SSDC 170 is connected to a second port of the dual port connector 150b. In an alternative embodiment, the dual port connector 150a-b may transmit the I/O request to only the master SSDC 160. In an alternative embodiment, the master SSDC 160 may receive I/O commands from an executable image 120 that are different from the I/O commands received by the slave SSDC 170 from a different executable image 120.

I/O requests are defined as read I/O requests and write I/O requests. In one embodiment, when a read I/O request is completed the SSDC notifies the other SSDC that the read I/O request was successfully completed. Then both SSDCs delete their copies of the read I/O request, meaning the SSDC executing the read I/O request and the SSDC in standby mode.

Write I/O requests are treated differently than read I/O requests because both SSDCs have copies of the write command and the data associated with the command. For a write I/O request once the SSDC completes writing all of the data both SSDCs delete the write I/O request and the data associated with the write I/O request.

Advantageously, both the master SSDC 160 and the slave SSDC 170 can see all of the flash array 180. Consequently if the master SSDC 160 fails, the slave SSDC 170 has a complete copy of the I/O request including the data in the case of a write I/O request and a hardware path to the flash array 180.

In one embodiment the master SSDC 160 is connected to a first port of the flash array 180 and the slave SSDC 170 is connected to a second port of the flash array 180.

The flash array 180 interacts with the master SSDC 160 and slave SSDC 170 to store and retrieve data. Specifically, the flash array 180 stores and retrieves data written and read by the executable image 120. Additionally, the OS of the runtime environment 110 may swap some or all of the executable image 120 to the flash array 180 as part of its responsibilities to manage the system resources. In one embodiment, the flash array 180 has a first port and a second port. A user may implement redundancy by connecting a master SSDC 160 to a first port of the flash array 180 and a slave SSDC 170 to a second port of the flash array 180.

In one embodiment the master SSDC 160 hardware and software are identical to the slave SSDC 170 hardware and software. In addition, the connector connecting the master SSDC 160 to the first port of the dual port connector 150a is identical to the connector connecting the slave SSDC 170 to the second port of the dual port connector 150b.

In one embodiment an inter-SSDC port connects the master SSDC 160 to the slave SSDC 170 and is identical to the port connecting the master SSDC 160 to the first port of the dual port connector 150a and identical to the port connecting the slave SSDC 170 to the second port of the dual port connector 150b. The inter-SSDC port allows the master SSDC 160 to transfer I/O requests and data to the slave SSDC 170 and visa versa. In addition, because the master SSDC 160 hardware and software and the slave SSDC 170 hardware and software are identical the same components can be purchased for both controllers. Additionally, since the master SSDC 160 and the slave SSDC 170 are identical, they are interchangeable and it is not necessary to stock two different parts.

In an alternative embodiment, a less expensive SSDC may be constructed by connecting both dual port connectors 150a-b to a single SSDC. However, this does not provide complete fault tolerance and redundancy as illustrated in FIG. 100.

In one embodiment, the master SSDC 160 and slave SSDC 170 are functionally identical. Because of the identical functionality if the master SSDC 160 fails the slave SSDC 170 may take over the work of the master SSDC 160 and the master SSDC 160 may take over the work of the slave SSDC 170.

In one embodiment, the master SSDC 160 and the slave SSDC 170 may be mounted on identical printed circuit boards (PCB's). In one embodiment, the PCB's may include a super-capacity capacitor. The super-capacity capacitor stores electrical energy and in the event of a loss of electrical input current the super-capacity capacitor contains enough electrical energy to allow the master SSDC 160 and the slave SSDC 170 to flush all write caches to the flash array 180 and confirm that all the data has been hardened and nothing remains in volatile buffers that will be lost when power is removed.

Figure 2:
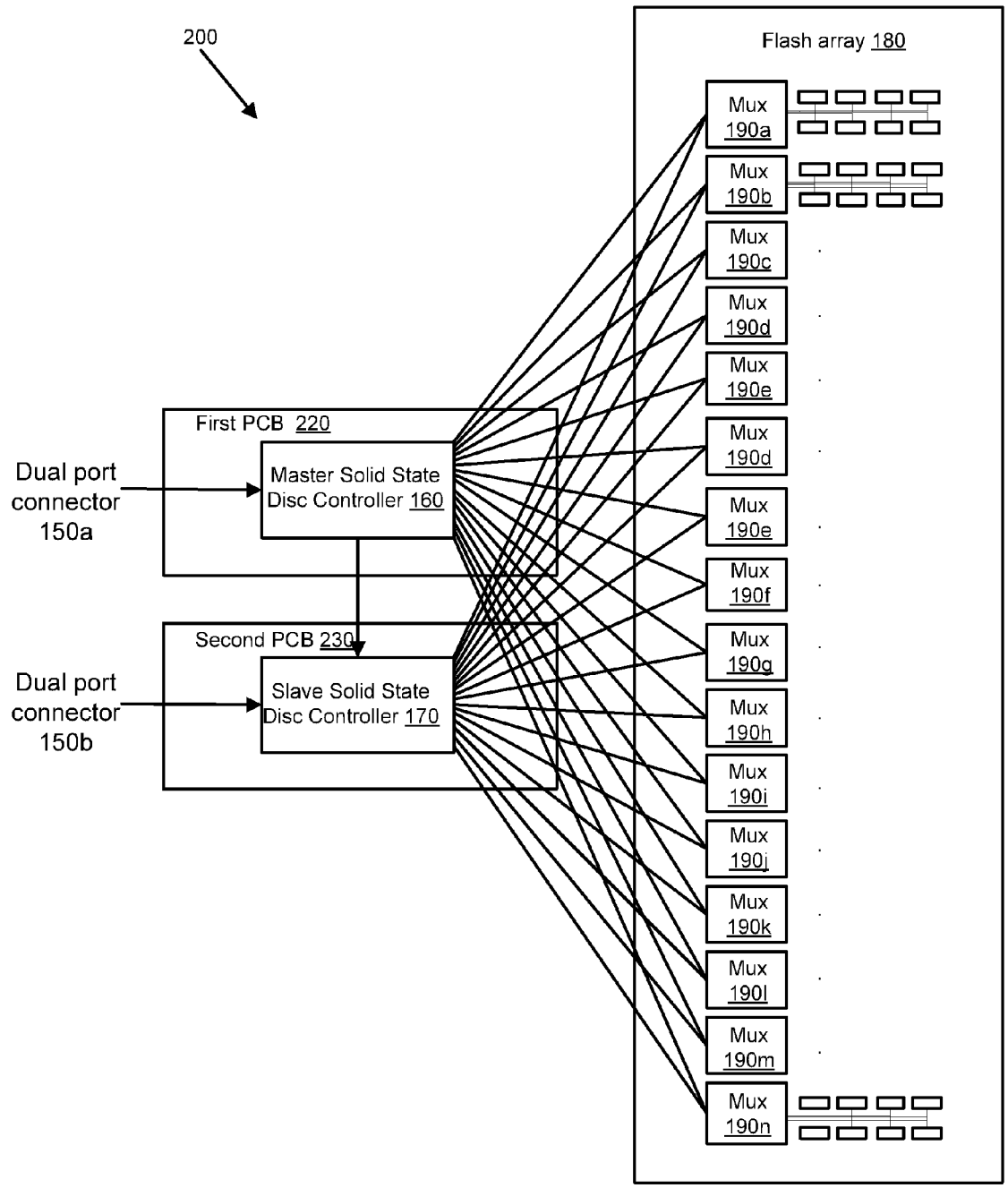
FIG. 2 is a detailed schematic diagram illustrating one embodiment of a method for a redundant and fault tolerant solid state disk, in accordance with one embodiment of the present invention.

FIG. 2 is a detailed schematic illustrating one embodiment of an apparatus 200 for a redundant and fault tolerant solid state disk. The apparatus includes a dual port connector 150a-b, a first printed circuit board (PCB) 220, a second PCB 230, a master SSDC 160, a slave SSDC 170, and a flash array 180. The flash array 180 comprises multiplexers or mux 190a-n, and flash array 180 chips.

A multiplexer or "mux" selects one of many analog or digital input signals and outputs that into a single line. An electronic multiplexer makes it possible for several signals to share one device.

The mux 190a-n interacts with the flash array 180 chips to create a Flash Mux and Fanout Bridge (not shown). Specifically, each Flash Mux and Fanout Bridge is connected to an equal number of flash array 180 chips. In one embodiment, the Flash Mux and Fanout Bridge select the flash array 180 chips to read from and write to based on chip enables from the master SSDC 160.

The master SSDC 160 interacts with the Flash Mux and Fanout Bridge to select and write to the flash array 180. In particular, the master SSDC 160 has data and enable lines connected to each Flash Mux and Fanout Bridge. The data lines permit the master SSDC 160 to read from and write to the flash array 180. The enable lines permit the master SSDC 160 to select the appropriate flash array 180 chips for reading and writing. In one embodiment, the master SSDC 160 activates the appropriate enable lines to enable the respective flash array 180 chips, and then reads data or writes data.

In one embodiment, the dual port connector 150a-b may connect the first port of the dual port connector 150a to the first PCB 220, the first PCB 220 containing the master SSDC 160. The second port of the dual port connector 150b may connect to the second PCB 230. The master SSDC 160 may be connected to the slave SSDC 170 via a connector and cable. The connector may be identical to the connector connecting the master SSDC 160 to the dual port connector 150a-b.

In one embodiment, the master SSDC 160 may be connected to the first port of the dual port mux 190a-n. The connection between the master SSDC 160 and the mux 190a-n may include data lines, address lines, control lines and the like.

In one embodiment, the dual port connector 150a-b may connect the second port of the dual port connector 150b to the second PCB 230. The second PCB 230 may contain the slave SSDC 170. The master SSDC 160 may be connected to the slave SSDC 170 via a connector, the connector may be identical to the connector connecting the slave SSDC 170 to the second port of the dual port connector 150b.

In one embodiment, the slave SSDC 170 may connect to the second port of the dual port mux 190*a-n*. The connection between the slave SSDC 170 and the mux 190*a-n* may include data lines, address lines, control lines and the like. In one embodiment, the master SSDC 160 and the slave SSDC 170 connect to every mux 190*a-n* and advantageously the master SSDC 160 and the slave SSDC 170 may connect to every flash array 180 chip through the mux 190*a-n*.

Advantageously, this embodiment provides complete redundancy between the dual port connector 150*a-b* and the flash array 180. No single failure will take the system down. In this embodiment, the master SSDC 160 may failover to the slave SSDC 170, in the event of a failure in the master SSDC 160.

In one embodiment, the responsibilities of the master SSDC 160 fails-over to the slave SSDC 170 and visa versa. The failover capabilities and responsibilities will be discussed in more detail below. In one embodiment, the connector, connecting the master SSDC 160 to the first port of flash array 180 is identical to the connector, connecting the slave SSDC 170 to the second port of the flash array 180.

The apparatus 200 implements redundancy by configuring a master SSDC 160 and a slave SSDC 170. Fault tolerance is implemented in the flash array 180 through the use of mathematical codes to detect and correct memory errors.

Additionally, the master SSDC 160 and slave SSDC 170 interact with the Flash Mux and Fanout Bridge to select a data bus. The data bus transports data between an SSDC and flash array 180. In one embodiment, the apparatus 200 may implement redundancy in an SSDC by programmatically determining if the master SSDC 160 data bus is enabled or if the slave SSDC 170 data bus is enabled. The slave SSDC 170 may serve as a back up to the master SSDC 160, for the purpose of completing an I/O request in the event that the master SSDC 160 fails.

In another embodiment, the master SSDC 160 may serve as a back up to the slave SSDC 170 for the purposes of completing an I/O request in the event that the slave SSDC 170 fails.

Figure 3:
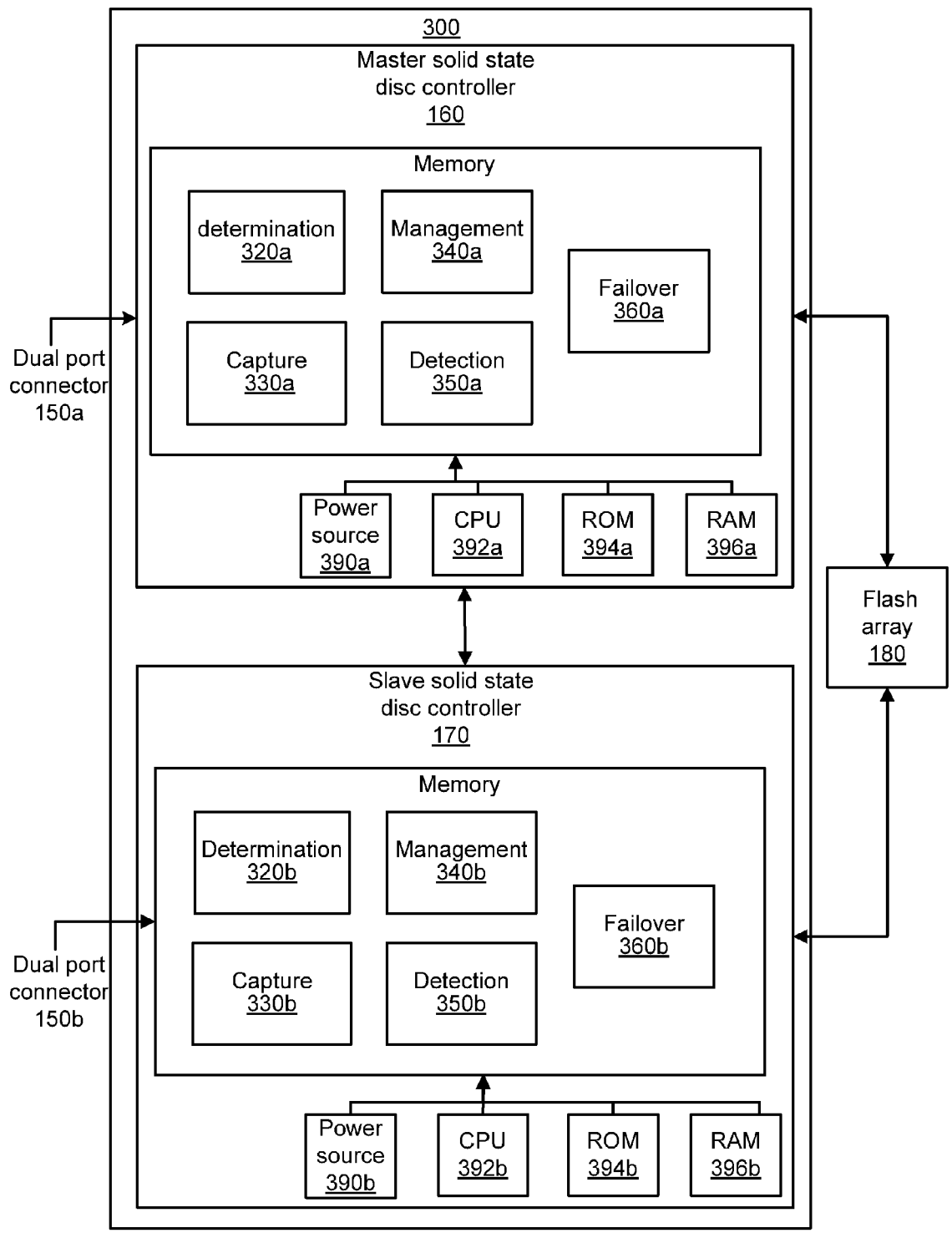
FIG. 3 is a schematic block diagram illustrating one embodiment of a system for a redundant and fault tolerant solid state disk, in accordance with one embodiment of the present invention.

FIG. 3 illustrates one embodiment of a system 300 for a redundant and fault tolerant solid state disk (SSD). The system includes: a master SSDC 160 comprising, a determination module 320*a*, a capture module 330*a*, a management module 340*a*, a detection module 350*a*, a error recovery and failover module 360*a*, a power source 390*a*, a CPU 392*a*, ROM 394*a*, and RAM 396*a*.

The modules illustrated in FIG. 3 are one embodiment of an implementation for a redundant and fault tolerant SSDC. The particular modularization of the functions illustrated in FIG. 3 are not intended to be restrictive. The functions may be grouped in different configurations or modules to accomplish the task of the invention.

In addition, FIG. 3 illustrates: a slave SSDC 170 comprising, a determination module 320*b*, a capture module 330*b*, a management module 340*b*, a detection module 350*b*, an error recovery and failover module 360*b*, a power source 390*b*, a CPU 392*b*, ROM 394*b*, and RAM 396*b*.

The determination module 320*a-b* interacts with the first PCB 220 and the second PCB 230 to determine which SSDC is the master SSDC 160 and which is the slave SSDC 170. In one embodiment, the SSDC reads a hardware configuration block, the hardware configuration block may contain push-down or pull-up resistors. A user may use the hardware configuration block to configure a redundant and fault tolerant solid state disk configuration.

In one embodiment, one of the SSDCs is configured as a master SSDC 160 and the other SSDC as a slave SSDC 170. Advantageously, the hardware configuration block enables a user to configure either SSDC as a master SSDC 160 or a slave SSDC 170 simply by configuring the hardware configuration block. In addition, a user may reconfigure the SSDC by removing the push-down or pull-up resistors and reinserting them in the new configuration. In an alternative embodiment, a simple jumper block configured on the PCB may be used to configure a master SSDC 160 and a slave SSDC 170.

In an alternative embodiment, the determination module 320*a-b* may read the SSDC configuration from a software repository. The software repository may be read only memory (ROM) and the configuration burned into ROM. Upon reading the configuration from ROM the SSDC becomes either a master SSDC 160 or a slave SSDC 170.

Master/Slave State Table:

| # of PCB's | 1$^{st}$ printed circuit board (PCB) | 2$^{nd}$ PCB |
|---|---|---|
| One PCB | master SSDC 160 | — |
| One PCB | — | master SSDC 160 |
| Two PCB's | master SSDC 160 | slave SSDC 170 |
| Two PCB's | slave SSDC 170 | master SSDC 160 |

The master SSDC 160 interacts with the system 300 to configure and maintain the master/slave state table. The master/slave state table may reside on different components of the system 100.

In one embodiment the master SSDC 160 may transmit the master/slave state table from the master SSDC 160 to the slave SSDC 170 via the inter-SSDC connector. In another embodiment, the master SSDC 160 may transmit a copy of the master/slave state table to the slave SSDC 170 via the dual port connector 150*a-b*. The dual port connector 150*a-b* may receive a copy of the master/slave state table and transmit it to the slave SSDC 170.

In one embodiment the master SSDC 160 may maintain the master/slave state table. When a change occurs in the state of either the master SSDC 160 or the slave SSDC 170 the master SSDC 160 transmits the state changes to the dual port connector 150*a-b* and to the slave SSDC 170.

The master SSDC 160 and the slave SSDC 170 interact with the system 300 to provide a fault tolerant and redundant solid state disk controller. In one embodiment, the master SSDC 160 connects to a first port of a dual port connector 150*a-b* and the slave SSDC 170 connects to a second port of the dual port connector 150*a-b*. Advantageously, the redundancy provided by the system 300 means there is no single point of failure from the dual port connector 150*a-b* to the SSDCs. Additionally, the master SSDC 160 connects to a first port of the flash array 180 and the slave SSDC 170 connects to a second port of the flash array 180. In this implementation there is no single point of failure between the SSDCs and the flash array 180.

The capture module 330*a* interacts with the master SSDC 160 to capture a copy of the I/O request. In particular, the capture module 330*a* creates a copy of the I/O request received by the master SSDC 160 from a port of the dual port connector 150*a-b*. In one embodiment, the capture module 330*a* intercepts the I/O request before it is executed in the master SSDC 160 and creates a copy of the I/O request. The capture module 330*a* creates a complete copy of the I/O request, if the I/O request is a read I/O request then the capture module transfers the request to the other SSDC, if the I/O request is a write I/O request then it transfers the write I/O request and the data to be written to the other SSDC.

Advantageously and uniquely the capture module 330a in the master SSDC 160 creates a copy of the I/O request that may be used to implement redundancy in the system 300. In particular the capture module 330a transfers the copy of the I/O request captured by the master SSDC 160 to the slave SSDC 170.

In one embodiment the capture module 330a may transfer the I/O request from the master SSDC 160 to the slave SSDC 170 over the inter-SSDC connector.

The capture module 330b interacts with the slave SSDC 170 to capture a copy of an I/O request. In particular, the capture module 330b creates a copy of the I/O request received by the slave SSDC 170 from a port of a dual port connector 150b. In one embodiment, the capture module 330b intercepts the I/O request before it is executed in the slave SSDC 170 and creates a copy of the I/O request.

Advantageously and uniquely the capture module 330b in the slave SSDC 170 creates a copy of the I/O request that may be used to implement redundancy in the system 300. In particular the capture module 330b transfers the copy of the I/O request captured by the slave SSDC 170 to the master SSDC 160. The capture module 330b may transfer the I/O request from the slave SSDC 170 to the master SSDC 160 over the inter-SSDC connector.

Once the I/O request has been completed, in the case of a read I/O request the SSDC executing the read I/O request notifies the other SSDC that the read I/O request is complete. Then both the master SSDC 160 and slave SSDC 170 delete their copies of the read I/O request and check for another I/O request. At the successful completion of a write I/O request the SSDC notifies the other SSDC and both SSDCs delete the write I/O request and the data associated with the write I/O request.

In one embodiment, other I/O requests such as SSDC status, memory status, memory size and the like may be supported.

The management module 340a may interact with the system 300 to define a memory access mode. In particular, the management module 340a defines a memory access mode to the flash array 180 for the master SSDC 160 and the slave SSDC 170. The management module 340a defines the memory access mode as active/active with memory locks, active/active without memory locks or active/passive.

In active/active mode with memory locks both the master SSDC 160 and the slave SSDC 170 may write to and read from the flash array 180. In particular, both SSDCs can access all flash chips in the flash array 180. A lock table (not shown) will exist for each of the flash chips in the flash array 180. If an SSDC wants to communicate with one of the flash chips it must get a lock. If an SSDC tries to get a lock and cannot, the SSDC can either spin until the lock is free or simply try another chip in the flash array 180 if possible. The lock table may exist in the flash array 180, master SSDC 160, slave SSDC 170 but will not be discussed in this specification.

In active/active mode without memory locks the master SSDC 160 may assign the slave SSDC 170 to access flash chips that the master SSDC 160 is not accessing, in other words, there are no conflicts between the flash chips accessed by the master SSDC 160 and the slave SSDC 170. Advantageously, in this configuration no flash chips are locked and therefore maximum throughput may be achieved because both the master SSDC 160 and slave SSDC 170 may access the flash array 180 concurrently and there is no latency for accessing the lock table.

Alternatively, in active/passive mode the master SSDC 160 executes all I/O requests, and the slave SSDC 170 in standby mode does not execute any I/O requests. Advantageously, the slave SSDC 170 has a copy of the master SSDC 160 I/O request and may complete the I/O request in the event that the master SSDC 160 fails to complete the I/O request. In addition, the master SSDC 160 also has a complete copy of the slave SSDC 170 I/O request and may complete the slave I/O request in the event that the slave SSDC 170 fails to complete the slave I/O request. In one embodiment, the apparatus 300 implements redundancy by implementing the master SSDC 160 and slave SSDC 170 with identical functionality, and each are capable of completing the I/O request in the event that the other SSDC fails.

The following Table describes potential memory access modes.

| Mode | Description |
| --- | --- |
| Active/Active, with memory locks | Master SSDC 160 places a memory lock on the flash chips in flash array 180 before reading/writing, then releases the memory lock. Slave SSDC 170 places a memory lock on the flash chips in the flash array 180 before reading/writing, then releases the memory lock. |
| Active/Active without memory locks | Master SSDC 160 addresses flash chips in the flash array 180 that are different from the flash chips addressed by the slave SSDC 170. |
| Active/Passive | The master SSDC 160 executes all I/O requests to flash array 180. |

The management module 340a interacts with the system 300 to translate an LBA to a flash chip. Specifically, the management module 340a translates the LBA from the I/O request into a physical address in the flash array 180.

The LBA's may be striped across multiple flash chips. Advantageously, this yields a significant performance improvement because the data is distributed across multiple memory addresses and I/O requests to the memory may occur simultaneously.

The management module 340a interacts with the system 300 to coordinate and prevent memory conflicts. In particular, the management module 340a synchronizes memory access by the master SSDC 160 and by the slave SSDC 170 with the flash array 180. The management module 340a may check a configuration table as depicted below. In the table below LBA addresses 0-49 are assigned to the master SSDC 160 and LBA addresses 50-99 are assigned to the slave SSDC 170.

| Logical Block Address | Assigned to |
| --- | --- |
| 0-49 | master SSDC 160 |
| 50-99 | slave SSDC 170 |

The detection module 350b interacts with the system 300 to monitor the health of the other SSDC. In particular, the detection module 350b monitors the health status of the master SSDC 160. Advantageously, a single point of failure is eliminated because the detection module 350b monitors a health status value to determine the health of the master SSDC 160. In one embodiment, the master SSDC 160 may periodically increment a watchdog count down timer. If the watchdog timer decrements to zero an interrupt may trigger a failover. In one embodiment, control of the system will fail over to the slave SSDC 170. The slave SSDC 170 takes over the work of the master SSDC 160 including completing the current the I/O request that may be in progress. Additionally, the master SSDC 160 may go to an off-line state.

In another embodiment, the detection module 350a monitors the health status of the slave SSDC 170. The detection module 350a monitors a health status value to determine the health of the slave SSDC 170. If the watchdog timer decrements to zero indicating the slave SSDC 170 has an error the slave SSDC 170 goes to an off-line state. In this embodiment, the master SSDC 160 may complete any I/O that the slave SSDC 170 had in progress.

In one embodiment, the master SSDC 160 and the slave SSDC 170 may monitor other health status information in addition to the watchdog timer. The health status value may contain, power, temperature, memory error counters and the like.

The error recovery and failover module 360b interacts with the system 300 to failover the work load from the master SSDC 160 to the slave SSDC 170. In particular, the error recovery and failover module 360b in the slave SSDC 170 fails over the workload from the master SSDC 160 to the slave SSDC 170 in the event that the master SSDC 160 fails. In one embodiment, if the master SSDC 160 becomes inoperable and fails to increment a watchdog timer the detection module 350b in the slave SSDC 170 will call the error recovery and failover module 360b to take the work load of the master SSDC 160 including any unfinished I/O requests. Additionally, the error recovery and failover module 360b may force the master SSDC 160 offline and upgrade the slave SSDC 170 to a master SSDC 160.

The error recovery and failover module 360a interacts with the system 300 to failover the workload from the slave SSDC 170 to the master SSDC 160. In particular, the error recovery and failover module 360a in the master SSDC 160 fails over the workload from the slave SSDC 170 to the master SSDC 160 in the event that the slave SSDC 170 fails. In one embodiment, if the slave SSDC 170 becomes inoperable and fails to increment a watchdog timer the detection module 350a in the master SSDC 160 will call the error recovery and error recovery and failover module 360a to take the work load of the slave SSDC 170, including any unfinished I/O requests. Additionally, the error recovery failover module 360b may force the slave SSDC 170 offline.

In one embodiment, the failed master SSDC 160 may assume the responsibility of a slave SSDC 170, and the previous slave SSDC 170 becomes the new master SSDC 160. If the new slave SSDC 170 is not stable it will be force off-line.

In another embodiment, the slave SSDC 170 may ping the master SSDC 160. If the master SSDC 160 does not respond within a predetermined period of time the slave SSDC 170 may assume the responsibilities of master SSDC 160 and force the old master SSDC 160 offline. The new master SSDC 160 may complete any I/O requests that were in progress.

Similarly the master SSDC 160 may periodically ping the slave SSDC 170. If the slave SSDC 170 does not respond within a predetermined period of time the master SSDC 160 may assume that the slave SSDC 170 has failed and indicate that the slave SSDC 170 is offline.

Figure 4:
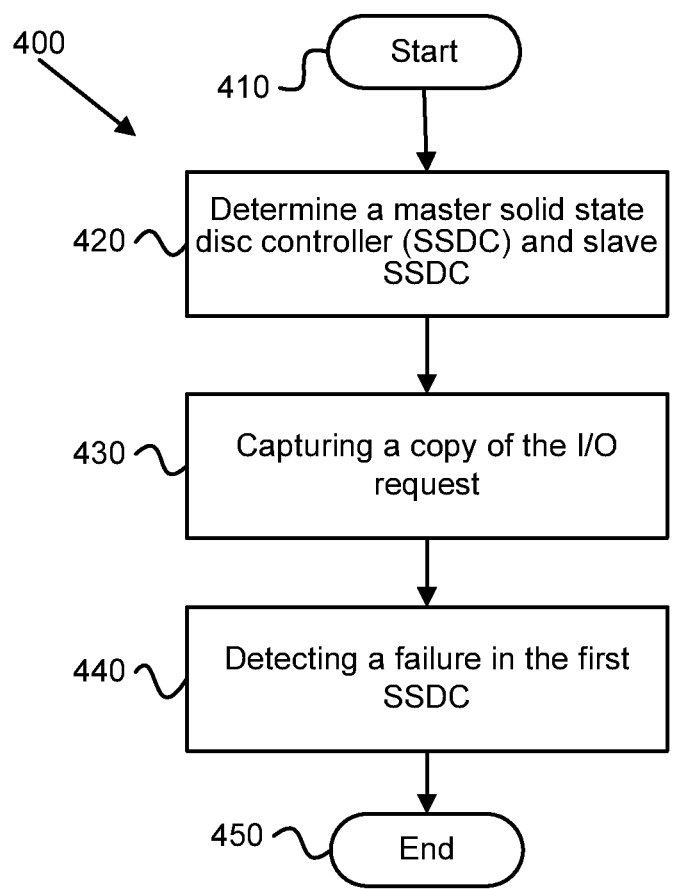
FIG. 4 is a flow chart diagram illustrating one embodiment of a method for a redundant and fault tolerant solid state disk, in accordance with one embodiment of the present invention.

FIG. 4 illustrates one embodiment of a method 400 for a redundant and fault tolerant solid state disk controller (SSDC). The operations may be implemented by the executed operations of a computer program product. The method 400 begins 410 when the system is booted.

Next the determination module 320 determines 420 the master/slave arrangement between a first SSDC and a second SSDC by reading a hardware configuration block or a software ROM. When an application executes an I/O request, or the OS executes an I/O request the capture module 330 captures 430 a copy of the I/O request, and determines 440 if the I/O request is a write I/O request. The system 400 handles a write I/O request differently than it handles other requests such as a read I/O request, status request or the like.

Finally, the detection module 350b running on the slave SSDC 170 detects 440 a failure in the master SSDC 160. Likewise the detection module 350a running on the master SSDC 160 detects 450 a failure in the slave SSDC 170. The method 400 then ends 450.

Figure 5:
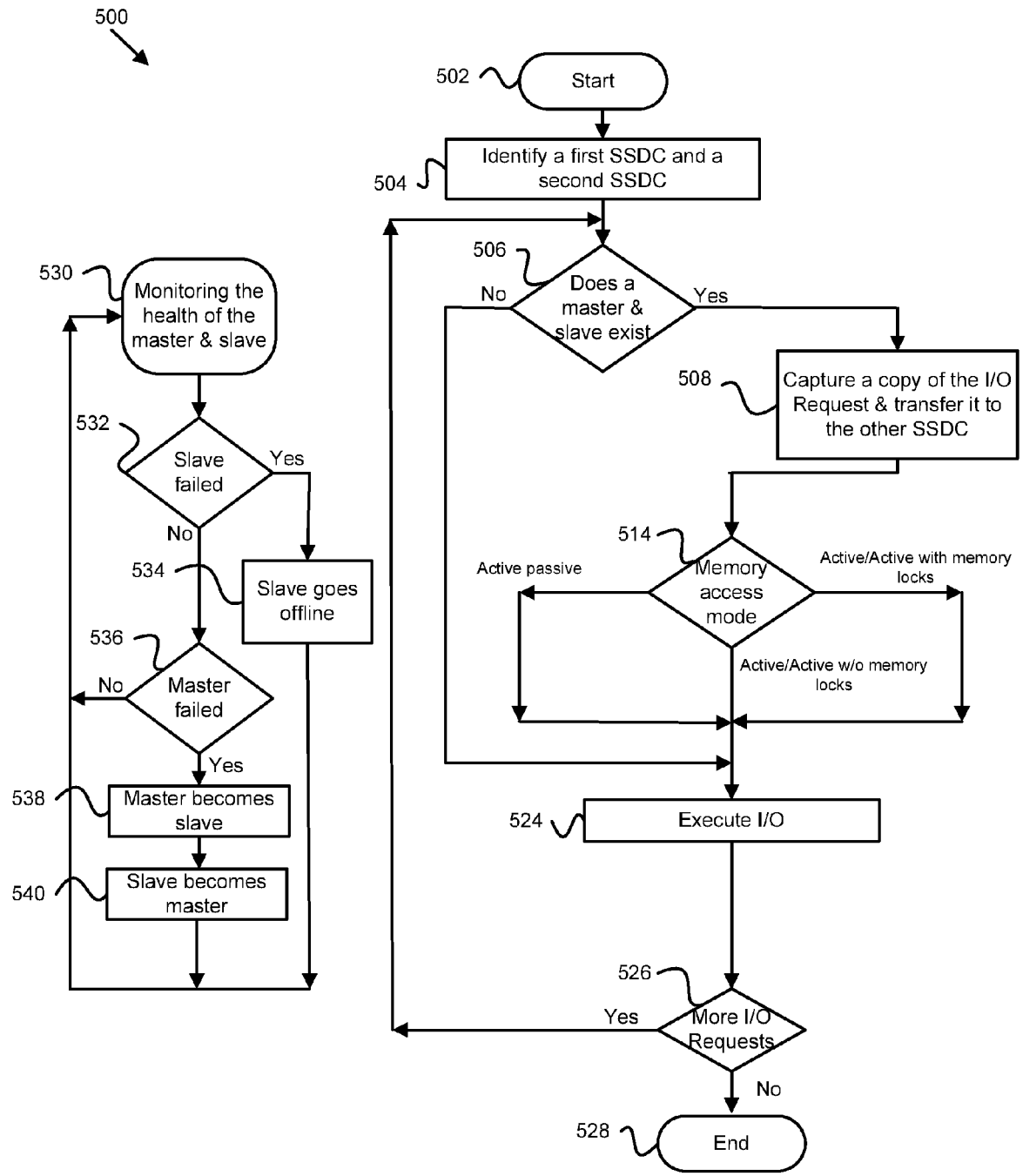
FIG. 5 is a detailed flow chart diagram illustrating one embodiment of a method for a redundant and fault tolerant solid state disk, in accordance with one embodiment of the present invention.

FIG. 5 illustrates one embodiment of a method 500 for a redundant and fault tolerant solid state disk controller (SSDC). The operations may be implemented by the executed operations of a computer program product. The method 500 begins 502 when an I/O request originates in an executable image 120. Alternatively, the I/O request may originate in the OS to swap a task to a storage repository.

In one embodiment, the determination module 320a identifies 504 a first SSDC and a second SSDC. Next the method checks 506 for a master SSDC 160 and a slave SSDC 170. If a slave SSDC 170 does not exist the method branches to step 526 and the master accesses the flash array 180. If a slave SSDC 170 does exist the capture module 330a captures 508 the I/O request and transfers it to the slave SSDC 170. Additionally, I/O requests received by the slave SSDC 170 are captured 508 by the capture module 340b and transferred to the master SSDC 160.

The capture module 330 determines if the I/O request is a write request 510 and transfers a copy of the write data 512 to the other SSDC and goes to step 514. If it is not a write I/O request the method proceeds directly to step 514.

Next the management module 340 determines 514 the memory access mode and takes a corresponding action. The memory access mode may comprise one of active/active with memory locks, active/active without memory locks, and active/passive.

In active/passive mode the master SSDC 160 accesses the flash array 180 while the slave SSDC is in standby mode. In active/active without memory locks the master SSDC 160 accesses the flash array 180 chip using Logical Block Addresses (LBA), and the slave accesses the flash array 180 chips using LBAs without either SSDC creating memory address contention.

In active/active with memory locks the master SSDC 160 obtains a lock from a lock table before accessing the flash array 180. Likewise the slave SSDC 170 obtains a lock from a lock table before accessing the flash array 180. Next the master SSDC 160 and slave SSDC 170 access 524 their respective flash array 180 chips without address contention. Then the master SSDC 160 and slave SSDC 170 release their locks.

Next, the method checks 526 for additional I/O requests. If more I/O requests exist the method branches to step 506. If additional I/O requests do not exist the method ends 528.

The detection module 350a constantly monitors 530 the status of the slave SSDC 170. If the slave SSDC 170 fails 532 the error recovery and failover module 360a forces 534 the slave SSDC 170 offline, and the master SSDC 160 takes over 538 the work load of the slave SSDC 170.

If the detection module 350b determines that the master SSDC 160 has failed 536 the error recovery and failover module 360b forces the master SSDC 160 offline 538 and the slave SSDC 170 becomes 540 a new master SSDC 160 and it takes over the workload of the old master SSDC 160.

Figure 6:
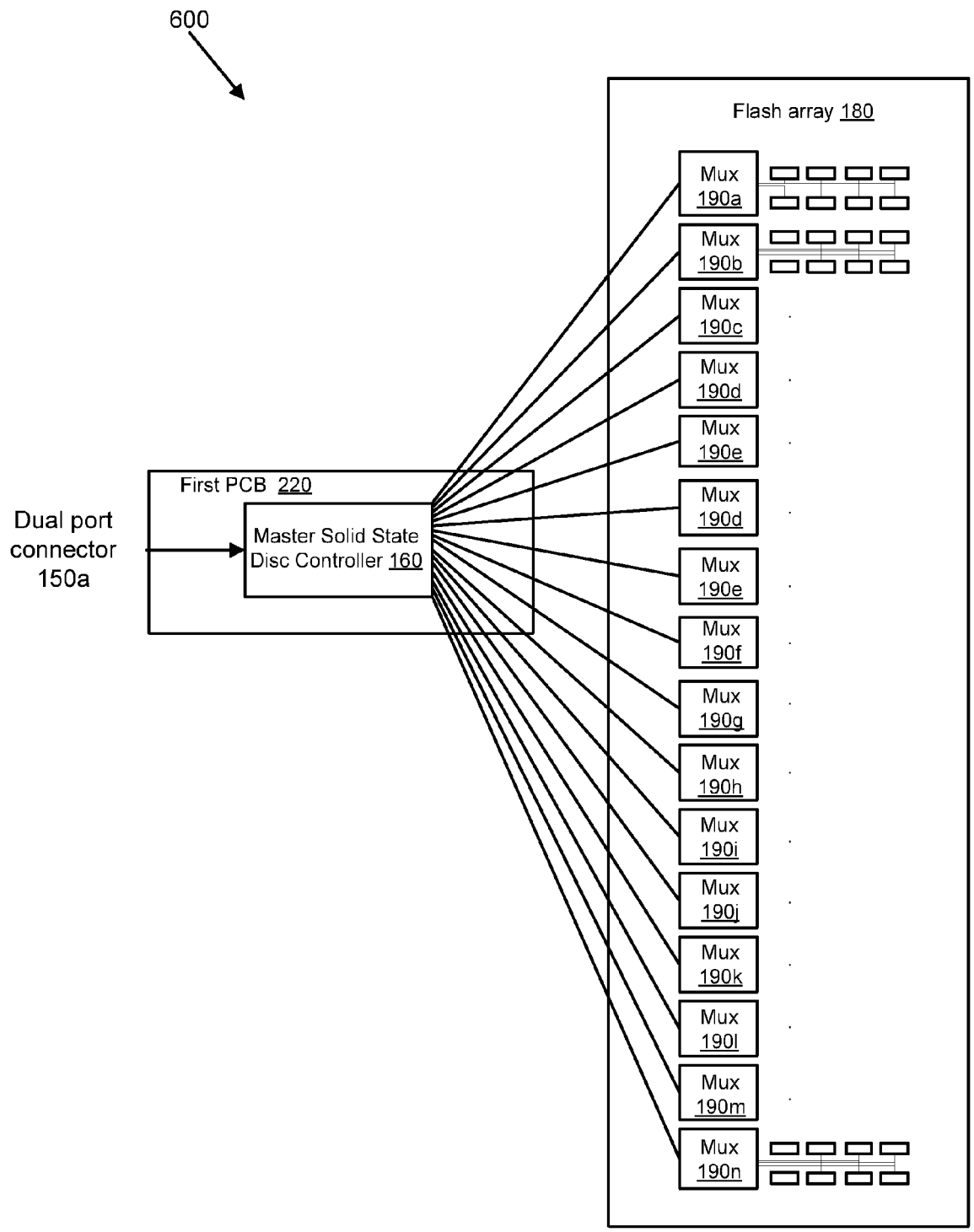
FIG. 6 is a detailed schematic diagram illustrating an alternative embodiment of the present invention.

FIG. 6 is a detailed schematic illustrating an alternative embodiment of an apparatus 600 of the invention. The apparatus 600 includes: a dual port connector 150a, a printed circuit board (PCB) 220, a master SSDC 160, and a flash array 180. The flash array 180 comprising: multiplexers or mux 190a-n, and flash array 180 chips.

The implementation of the apparatus of FIG. 6 is similar to that of FIG. 2, with the exception that there is no hardware redundancy. Specifically, a second redundant solid state disk controller does not exist. In one embodiment, the determination module 320a interacts with the system 300 to determine that a slave SSDC 170 does not exist.

The capture module 330a interacts with the system 300 to capture an I/O request. In particular, the capture module 330a captures the I/O request received from a connector, the I/O request comprising: a command, parameters and data. The capture module 320a captures a complete copy of the I/O request and saves a copy of I/O request until the I/O request has been completed. If after accessing the flash array 180 the I/O request has errors the master SSDC 160 may retry the I/O request using the copy of the captured I/O request.

The detection module 350a interacts the apparatus 600 to detect a system failure. In particular the detection module 350a may detect a system hang or similar system error. In one embodiment, if the master SSDC 160 does not increment the watchdog timer, the watchdog timer will fire and the detection module 350a will be called. The detection module 350a then calls the error recovery and failover module 360a.

The error recovery and failover module 360a interacts with the apparatus 600 to automatically take action. Specifically, the action taken by the error recovery and failover module 360a when a backup or redundant SSDC does not exist may comprise, retrying the I/O request, resetting the SSDC, rebooting the SSDC, sending an error message, halting the SSDC, and the like.

In one embodiment, a user may implement some level of redundancy in a single master SSDC 160 arrangement by preserving the I/O request until it has completed. Then if the I/O fails the SSDC may retry the I/O request. Additionally, the failover module 360a may execute a reboot of the SSDC. A reboot would reload the software and the I/O request could then be reattempted.

Additionally, a reset may be executed. A reset is a more drastic step than the software reboot and would initialize the registers and reload the software. Finally, if none of these steps are successful in completing the I/O request the failover module 360a may return an error message.

What is claimed is:

1. A solid state apparatus comprising:
a first solid state disc controller (SSDC);
a second SSDC; and
a flash array comprising a first flash port and a second flash port, the first SSDC configured to connect to the flash array through the first flash port and the second SSDC configured to connect to the flash array through the second flash port, wherein the second SSDC determines a master/slave relationship between the first SSDC and the second SSDC and automatically reassigns works from the first SSDC master to the second SSDC slave in response to detecting a failure in the first SSDC, and the first SSDC, second SSDC, and flash array are within a common solid state drive.

2. The solid state apparatus of claim 1, further comprising a first data bus between the first SSDC and the flash array and a second data bus between the second SSDC and the flash array.

3. The solid state apparatus of claim 1, further comprising one or more capacitors to provide electrical energy to the solid state drive in the event of power loss.

4. The solid state apparatus of claim 1, wherein the flash array further comprises a dual port multiplexer, the dual port multiplexer comprising the first flash port and the second flash port.

5. The solid state apparatus of claim 1, wherein the second SSDC is substantially functionally identical to the second SSDC.

6. The solid state apparatus of claim 5, wherein the first SSDC and the second SSDC are physically and functionally interchangeable.

7. The solid state apparatus of claim 1, wherein the first SSDC and the second SSDC each comprise an inter-SSDC port configured to connect the first SSDC to the second SSDC.

8. The solid state apparatus of claim 1, wherein the second SSDC is configured to:
capture a copy of an I/O request received by the first SSDC and identify a write I/O request from the I/O request; and
detect the failure in the first SSDC.

9. The solid state apparatus of claim 1, wherein the first SSDC and the second SSDC are both configured to connect to all memory within the flash array.

10. The solid state apparatus of claim 1, further comprising a first solid state apparatus port and second solid state apparatus port.

11. A computing system comprising:
a runtime environment comprising a processor and memory hardware; and
a solid state drive, comprising,
a first solid state disc controller (SSDC),
a second SSDC, and
a flash array comprising a first flash port and a second flash port, the first SSDC configured to connect to the flash array through the first flash port and the second SSDC configured to connect to the flash array through the second flash port, wherein the second SSDC determines a master/slave relationship between the first SSDC and the second SSDC and automatically reassigns works from the first SSDC master to the second SSDC slave in response to detecting a failure in the first SSDC, and the first SSDC, second SSDC, and flash array are within the common solid state drive;
wherein the runtime environment is configured to interface with the solid state drive to read from and write to the flash array.

12. The computing system of claim 11, wherein the solid state drive further comprises a first data bus between the first SSDC and the flash array and a second data bus between the second SSDC and the flash array.

13. The computing system of claim 11, wherein the solid state drive further comprises one or more capacitors to provide electrical energy to the solid state drive in the event of power loss.

14. The computing system of claim 11, wherein the flash array further comprises a dual port multiplexer, the dual port multiplexer comprising the first flash port and the second flash port.

15. The computing system of claim 11, wherein the first SSDC and the second SSDC each comprise an inter-SSDC port configured to connect the first SSDC to the second SSDC.

16. The computing system of claim 11, wherein the second SSDC is configured to:
capture a copy of an I/O request received by the first SSDC and identify a write I/O request from the I/O request; and
detect the failure in the first SSDC.

17. The computing system of claim 11, wherein the first SSDC and the second SSDC are both configured to connect to all memory within the flash array.

18. A solid state apparatus comprising:
a first solid state disc controller (SSDC) located on a first printed circuit board (PCB), the first SSDC comprising a first inter-SSDC port;
a second SSDC located on a second PCB, the second SSDC comprising a second inter-SSDC port configured to connect to the first SSDC via the first inter-SSDC port;
a flash array comprising a first flash port and a second flash port; and
first and second data buses, wherein the first a first data bus connects the first SSDC to the flash array and the second data bus connects the second SSDC to the flash array;
wherein the first SSDC configured to connect to the flash array through the first flash port and the second flash array configured to connect to the flash array through the second flash port, wherein the second SSDC determines a master/slave relationship between the first SSDC and the second SSDC and automatically reassigns works from the first SSDC master to the second SSDC slave in response to detecting a failure in the first SSDC, and the first SSDC, second SSDC, and flash array are within a common solid state drive.

\* \* \* \* \*